Nov. 24, 1970 W. R. NORDQUIST 3,543,243

DATA RECEIVING ARRANGEMENT

Filed Sept. 13, 1967

INVENTOR
W. R. NORDQUIST
BY
ATTORNEY

United States Patent Office 3,543,243

Patented Nov. 24, 1970

3,543,243

DATA RECEIVING ARRANGEMENT

Walter R. Nordquist, Naperville, Ill., assignor to Bell Telephone Laboratories, Incorporated, Murray Hill and Berkeley Heights, N.J., a corporation of New York Filed Sept. 13, 1967, Ser. No. 667,472
Int. Cl. G06f 7/28
U.S. Cl. 340—172.5 7 Claims

ABSTRACT OF THE DISCLOSURE

A shift register and control logic arrangement is responsive to an asynchronous series of data pulses preceded by a start pulse and followed by a stop pulse to register the bits represented by the start and data pulses and to unload and reset the register under control of the stop pulse. When the start bit is shifted to a predetermined register stage, further register shifts are inhibited. Data bits stored in the register are unloaded in parallel in response to the leading edge of the stop pulse and the register is restored to its initial state in response to the trailing edge of the stop pulse. The start, the data and the stop pulses are utilized directly to clock the advance of shift register elements on an asynchronous time basis.

BACKGROUND OF THE INVENTION

Figure 1:
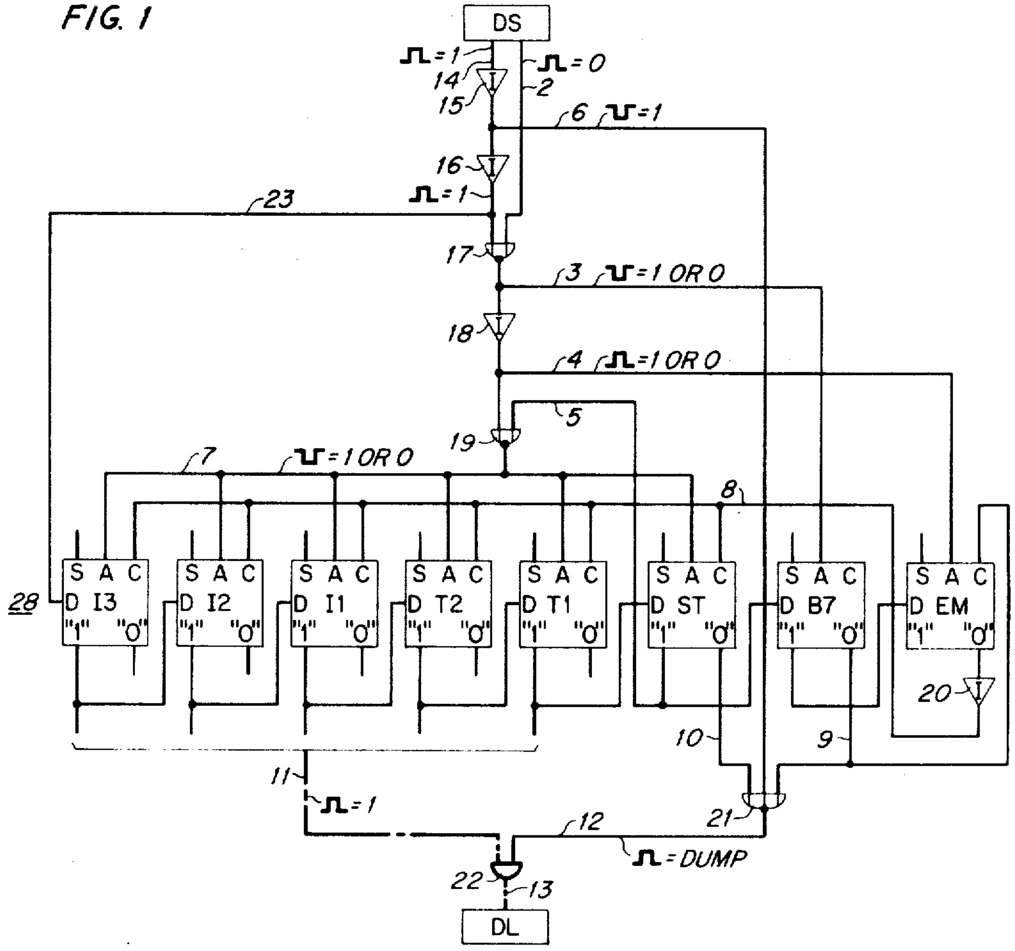

Many data transmission arrangements represent each respective data bit of a data word by one of a serially transmitted group of binary coded data pulses. In such arrangements a multistage shift register is employed to store each data bit when its representative data pulse is received. Previously received bits are advanced through successive register stages as each successive data bit is registered in the first shift register stage. A start pulse, which precedes the group of data pulses, is used to define the beginning of a new group of information pulses and to indicate that a complete group of information pulses has been received. The start pulse is registered as a bit of predetermined value in the initial stage of the shift register and is advanced through the subsequent shift register stages as subsequent data bits are registered. The arrival of the start bit in the last shift register stage indicates that a complete group of data pulses has been received, that the serially received data bits can be unloaded (gated out) in parallel from the stages of the register in which they are stored and that the shift register can be restored to its initial state in preparation for the receipt of another group of data pulses.

Information must be settled in the shift register before the register is unloaded and the register must be unloaded before the register is restored. Otherwise, inaccurate information will be gated from the register. Possible race conditions exist between receipt of the last information bit and the register unloading function and between the unloading function and the register restore function if the start bit alone is used to initiate both functions. Externally generated clock signals have been employed to assure that the register is not prematurely restored to its initial state. Different clock signals are combined with the unload register indication provided by the start bit to initiate the register unload and register restore functions in proper sequence and at different times. The external generation of clock pulses and the logical application thereof to control the shift register functions require additional and complex circuitry.

Another expedient which has been employed to assure the proper sequence of register unload and register restore functions is the insertion of a time delay between the functions by means of a time delay circuit. The capacitive elements employed in delay circuits are not easily incorporated in integrated circuits and are relatively expensive when incorporated in an integrated circuit. Thus, the employment of delay circuits to insert time delays between the receipt of a last information bit, the register unload function and the register restore function does not lend itself to implementation by means of integrated circuits.

BRIEF SUMMARY OF THE INVENTION

It is an object of my invention to control a shift register by means of circuitry compatible with integrated circuit implementations to asynchronously store a group of serially transmitted data bits and to unload and restore the register in proper sequence after receipt of the data bits without employing externally generated control signals.

In accordance with one illustrative embodiment of my invention, a multistage shift register is equipped with additional register stages and associated logic which inhibit further register shifts after receipt of a predetermined number of information pulses, initiate a register unload operation upon receipt of an information pulse of predetermined value while the register is so inhibited, and initiate a register restore operation upon termination of the latter information pulse.

The shift register is comprised of a plurality of cascaded register stages, certain of which are employed to store data bits and certain of which are employed to control register advance, register unload and register restore operations. A sequence of data storage register stages is followed by a start bit register stage, an unload register control stage and a restore register control stage. The serially transmitted pulse group includes a series of data pulses equal in number to the number of data storage stages in the register. The series of data pulses is preceded in the pulse group by a start pulse and followed in the pulse group by a stop pulse. Both the start pulse and the stop pulse represent a predetermined binary value, e.g., a binary 1.

Initially, in this specific illustrative embodiment of my invention, each data storage stage is RESET (i.e., contains a binary 0), the start bit stage is RESET, the unload control stage contains a binary 1 and the restore control stage contains a binary 1. Other binary values can be employed in the various register stages by simple logic rearrangement. When in the binary 1 state, the restore control stage provides a continuous RESET signal to all the data stages and to the start bit stage of the register. The storage and shifting of information bits in the register is controlled by advance pulses which are derived directly from the received information pulses of the serially transmitted pulse group. No externally clocked synchronization is employed.

When the start pulse is received, the binary 0 in the start bit stage is shifted to the unload control stage. This shift of a binary 0 into the unload control stage directly causes the restore control stage to be RESET, i.e., assume a binary 0 state. This results in the RESET signal being removed from the data storage stages and from the start bit stage of the register. When the RESET signal is thus removed, the start bit (a binary 1) represented by the start pulse is registered in the first data storage stage of the register. In response to the subsequent data pulses and storage of the data bits represented thereby, the start bit is shifted from the first data storage stage through the other data storage stages to the start bit stage of the register.

When, as a result of the receipt of all data pulses in the group, the start bit is shifted into the start bit stage of the register, further changes in state by the data storage and start bit stages in response to received information signals are inhibited. When the stop pulse is received, the start bit (a binary 1) is shifted from the start bit stage to the unload control stage, but the states of the data storage and start bit stages remain unchanged. The combination of a binary 1 in the start bit stage, a binary 1 in the unload control stage and the reception of the stop pulse (a binary 1) initiates a register unload operation during which the data bits stored in the data storage stages are gated in parallel out of the register to a data load. The transition in potential resulting from the trailing edge of the stop pulse is then utilized as an advance signal to shift the binary 1 in the unload control stage into the restore control stage. As indicated above, when the restore control stage contains a binary 1, a RESET signal is supplied to all of the data storage stages and to the start bit stage. Accordingly, the data storage and start bit stages of the register are RESET after the data bits contained in the data storage stages have been unloaded and the register is thereby restored to its initial state.

The above-described arrangement utilizes the stop, start and data pulses themselves on an asynchronous basis to clock the advance of the shift register and to control the register unload and the register restore functions. No externally generated clock signals are employed. The possible race conditions between the receipt of the last bit, the unload operation and the restore operation are eliminated by employing the leading edge transition of the stop pulse to initiate the unload operation and by employing the trailing edge transition of the stop pulse to initiate the restore operation. Since no capacitive or inductive elements are required for either the shift register or the control logic, the arrangement is fully compatible with implementation by means of integrated circuits.

DRAWING

Figure 2:
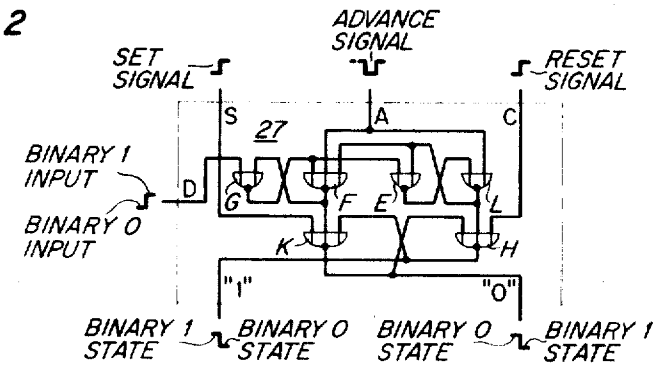

FIG. 1 is a symbolic representation of an illustrative data receiving arrangement in accordance with my invention; and FIG. 2 is a symbolic logic diagram of a flip-flop which can be employed advantageously as a memory element of the shift register shown in FIG. 1.

DETAILED DESCRIPTION

The flip-flop 27 symbolically represented in FIG. 2, is a gated flip-flop which can be used advantageously as a bistable memory element stage in the shift register 28 shown in FIG. 1. When a binary 1 is stored in the flip-flop 27, the potential at terminal "1" is high with respect to ground, the potential at terminal "0" is low and the flip-flop 27 is said to be in the binary 1 or SET state. When the flip-flop 27 contains a binary 0, the potential at terminal "0" is high with respect to ground, the potential at terminal "1" is low and the flip-flop is said to be in the binary 0 or RESET state.

When the potential at the advance terminal A of flip-flop 27 is changed from high to low, the binary bit value, 0 or 1, represented by the state of data terminal D is gated into the flip-flop 27. A binary 1 is represented by high potential at terminal D and a binary 0 is represented by low potential at terminal D. The entry of the bit into the flip-flop 27 takes place at the time an advance signal is applied which causes the potential at terminal A to switch from high to low. If the data terminal D subsequently changes state, the new data bit represented by the changed state of terminal D is not gated into the flip-flop until the next high-to-low transition of the potential at terminal A.

When the potential at terminal C is high, the potential at terminal "1" is forced to be low by the operation of NOR gate H irrespective of potentials at any other terminal of flip-flop 27. When the potential at advance terminal A is in the high state, the flip-flop 27 can be RESET by raising the potential on RESET terminal C to a high state. If a RESET signal (i.e., application of high potential) is present on terminal C when an advance signal (a transition from high to low potential) is received on terminal A and the RESET signal is removed from terminal C before the end of the advance signal, the final stable binary state of the flip-flop 27 is determined by the potential at data terminal D at the beginning of the advance signal, i.e., when the advance terminal A changed from high to low potential. In other words, an advance signal pulse on terminal A, while initially sensing and forwarding the binary information on terminal D, also locks up the input information from terminal D for the duration of the advance signal pulse by way of the feedback connections between NOR gates L and E and NOR gates F and G within flip-flop 27.

The illustrative embodiment of my invention shown in FIG. 1 comprises a shift register 28, associated control logic, a data source DS and a data load DL. The shift register 28 comprises a sequence of bistable data storage register stages I3, I2, I1, T2 and T1 which sequence is succeeded by a start bit register stage ST, an unload register control stage B7 and a restore register control stage EM. The number of data storage register stages I3–T1 is equal to the number of data bits in the format of the data words being transmitted. In the illustrative embodiment of FIG. 1, the arrangement is equiped to receive data words which contain five data bits. Each respective register stage can advantageously comprise a gated flip-flop having the characteristics of the aforenoted flip-flop 27 shown in FIG. 2.

Information is gated into the initial data storage stage *i*3 and shifted to the succeeding data storage stages I2, I1, T2, T1 in response to advance signals applied over lead 7 to the A terminal of each respective data storage stage I3–T1. Information is shifted from the last data storage stage T1 to the start bit stage ST in response to an advance signal applied to terminal A of stage ST over lead 7. Information is transmitted from stage ST to unload control stage B7 in response to an advance signal applied to terminal A of stage B7 over lead 3. Information is transmitted from stage B7 to restore control stage EM responsive to application of an advance signal over lead 4 to terminal A of stage EM.

A sequence of information pulses, each coded to represent a binary data bit, is received from data source DS over conductors 2 and 14. A positive going pulse received on conductor 14 represents a binary 1. A positive going pulse received on conductor 2 represents a binary 0. The sequence of information pulses representing the data bits of a data word is preceded by a start pulse and is followed by a stop pulse. In the illustrative embodiment of my invention being described, both the start pulse and the stop pulse are coded to represent binary 1's and thus are received as positive going pulses on lead 14.

In the initial condition of shift register 28, i.e., before a group of information pulses is received, the data storage and start bit stages I3, I2, I1, T2, T1 and ST are in the RESET state and the unload control and restore control stages B7 and EM are in the binary 1 state. In this initial condition a high potential RESET signal is continuously applied by inverter 20 over lead 8 to the RESET terminal C of each of the data storage and start bit stages I3–ST. This RESET signal continues so long as stage EM is in the binary 1 state. The shift register 28 is returned to this initial condition after each register dump operation as a function of the register restore operation.

It will be assumed, for purposes of this description, that the data word 11001 is received by the arrangement shown in FIG. 1. As indicated above, the start pulse represents a binary 1 and therefore appears as a positive going pulse on lead 14. The start pulse is transmitted through inverter 15, inverter 16 and NOR gate 17 and appears as a negative going pulse on lead 3. Accordingly, the potential on lead 3 changes from high to low. The start pulse is thus applied as an advance signal over lead 3 to the advance terminal A of stage B7. As mentioned earlier herein, stage ST initially contains a binary 0. In response to the advance signal on terminal A of stage B7, the binary 0 in stage ST is entered in stage B7. When this occurs, the "0" terminal of stage B7 changes from low to high potential and directly applies a continuous RESET signal to terminal C of stage EM. This RESET signal continues until stage B7 is returned to the binary 1 state. When stage EM is RESET, i.e., assumes the binary 0 state, the potential at terminal "0" of stage EM changes from low to high. As a result, the continuous high potential RESET signal on lead 8, which was applied by inverter 20 to the C terminals of stages I3, I2, I1, T2, T1 and ST, is removed. This occurs prior to the termination of the advance signal.

The start pulse received over lead 14 also is applied as an advance signal to the advance terminal A of each of the stages I3, I2, I1, T2, T1 and ST. The proper negative going polarity for an advance signal is achieved by transmitting the positive going start pulse through inverter 15, inverter 16, NOR gate 17, inverter 18 and NOR gate 19 to lead 7. When the advance signal on lead 7 is applied to the respective advance terminals A of stages I3, I2, I1, T2, T1 and ST, the binary 1 represented by the start pulse and appearing as a positive going pulse at terminal D of stage I3 over lead 23 is stored in the initial data storage stage I3. At the same time, the binary 0's initially contained in stages I3, I2, I1, T2 and T1 are each shifted to the immediately following register stage I2, I1, T2, T1 and ST, respectively.

At the end of the start pulse, an advance signal (i.e., a transition from high to low potential) is applied over lead 4 to the advance terminal A of stage EM. Since a continuous REST signal is applied over lead 9 to terminal C of stage EM and stage B7 contains a binary 0, no change of state will occur in stage EM until stage B7 is placed in the binary 1 state, as described later herein.

However, it should be noted that the advance signal applied to stage EM occurs after the termination of the advance signal applied to the other stages of the register. This is due to the polarity of the signal on lead 4 derived from the start pulse received over lead 14. Since lead 4 normally is at low potential, the transition from a high to low potential occurs on lead 4 at the end of the positive going pulse rather than at the beginning of the negative going pulse provided on leads 3 and 7 to the advance terminals A of the other register stages. The significance of this will be described later herein.

It should also be noted that a possible race condition exists between removal of the RESET signal from lead 8 and application of the advance signal over lead 7. The flip-flop 27, shown in FIG. 2 and described earlier herein, eliminates the race condition possibility since information appearing at data input terminal D at the time of the initial application of an advance pulse to terminal A will be stored in the flip-flop 27 so long as the RESET signal is removed from terminal C before the end of the advance signal, i.e., before the potential at terminal A returns to the high condition.

The first data pulse of the information pulse group representing the binary word 11001 is a binary 1 and will therefore be received on lead 14 as a positive going signal. Operation of the arrangement of FIG. 1 in response to the reception of the first data pulse is identical to that described above relative to the reception of the start pulse, except that the RESET has already been removed from data storage stages I3, I2, I1, T2, T1 and start bit stage ST. Accordingly, in response to the first data pulse, a binary 1 is stored in the initial stage I3, the start bit (a binary 1) is shifted from stage I3 to stage I2, and the binary 0 in each of the stages I2, I1, T2, T1, ST and B7 is shifted to the immediately succeeding register stage I1, T2, T1, ST, B7 and EM, respectively.

The second data pulse of the group representing the data word 11001 is also a binary 1. Operation of the arrangement of FIG. 1 in response to the reception of this second data pulse again is identical to that described above for the first data pulse. Accordingly, a binary 1 is entered in stage I3, a binary 1 is shifted to stage I2, the start bit is shifted to stage I1 and a binary 0 is shifted to each of the register stages T2, T1, ST, B7 and EM.

The third bit of the data word 11001 is a binary 0 and will be received as a positive going signal on conductor 2. The positive going signal on conductor 2 is transmitted through NOR gate 17, inverter 18, and NOR gate 19 to lead 7 and applied as a negative going advance signal to the advance terminals A of stages I3, I2, I1, T2, T1 and ST. The positive going data pulse on lead 2 also is transmitted through NOR gate 17 to conductor 3 and applied as a negative going advance signal to advance terminal A of stage B7. Thus, the advance signals generated in response to a positive going signal on conductor 2 representing a binary 0, are identical to the advance signals generated by a positive going signal on conductor 14, representing a binary 1. However, the positive going data pulse on conductor 2 is not applied to conductor 23 and therefore does not raise the potential at terminal D of the initial register stage I3. The potential at terminal D of stage I3 therefore remains low and represents a binary 0.

Due to the application of advance signals to the register stages I3–B7 and the low potential state of conductor 23, a binary 0 is stored in stage 13. Additionally, each of the bits already stored in the register is shifted forward by one register stage, i.e., a binary 1 is shifted from stage I3 to stage I2, a binary 1 is shifted from stage I2 to stage I1, the start bit is shifted from stage I1 to stage T2 and a binary 0 is shifted to each of the register stages T1, ST, B7 and EM.

The fourth bit of the data word 11001 also is a binary 0. Therefore, operation of the arrangement of FIG. 1 in response to the reception of the fourth data pulse is identical to that described above with respect to the third data pulse. Accordingly, a binary 0 is entered in stage I3, a binary 0 is shifted from stage I3 to stage I2, a binary 1 is shifted from stage I2 to stage I1, a binary 1 is shifted from stage I1 to stage T2, the start bit is shifted from stage T2 to stage T1 and a binary 0 is shifted to each of the register stages ST, B7 and EM.

The last bit of the data word 11001 is a binary 1. In response to the data pulse representing this bit, as described earlier with respect to the first and second bits of the data word 11001, a binary 1 is entered in stage I3 and each of the bits previously stored in the stages of the shift register are advanced to the next stage. As a result, a binary 0 is shifted from stage I3 to stage I2, a binary 0 is shifted from stage I2 to stage I1, a binary 1 is shifted from stage I1 to stage T2, a binary 1 is shifted from stage T2 to stage T1, the start bit is shifted from stage T1 to stage ST and a binary 0 is shifted to each of the stages B7 and EM.

When the start bit is shifted into the start bit stage ST, stage ST assumes the binary 1 state in which the "1" terminal thereof is at high potential. This high potential is applied over lead 5 to NOR gate 19. Application of high potential to one input of NOR gate 19 causes lead 7 to remain at low potential thereby inhibiting application of any further advance signals to stages I3, I2, I1, T2, T1 and ST. The "0" terminal of stage ST is placed at low potential when stage ST enters the binary 1 state. Accordingly, lead 10 now has low potential applied thereto.

The stop pulse, which follows the group of data pulses, represents a binary 1 and therefore is received as a positive going pulse on lead 14. The stop pulse is transmitted through inverter 15, inverter 16, and NOR gate 17 and appears on lead 3 as a negative going signal. This negative going signal on lead 3 is applied as an advance signal to terminal A of stage B7. In response to the advance signal on lead 3, the binary 1 in stage ST is entered in stage B7 and stage B7 assumes the binary 1 state. When stage B7 changes from the binary 0 to the binary 1 state, lead 9 changes from high to low potential. This removes the RESET signal from terminal C of stage EM.

The stop pulse on lead 14 also is transmitted through inverter 15 and appears as a negative going pulse on lead 6. All of the input leads to NOR gate 21 are now at low potential. Lead 6 is placed at low potential by the inverted stop pulse, lead 10 is at low potential due to stage ST being in the binary 1 state, and lead 9 is at low potential due to stage B7 being in the binary 1 state. When all the input leads to NOR gate 21 are at low potential, the potential applied to lead 12 by NOR gate 21 changes from low to high.

The heavyweight AND gate symbol designated 22 symbolically represents a plurality of AND gates. Each of the AND gates 22 has one input connected through cable 11 to the "1" terminal of a respective one of the data sotrage stages I3, I2, I1, T2 and T1, and the other input connected over lead 12 to the output terminal of NOR gate 21. When the potential of lead 12 becomes high, as described above, register 28 is unloaded. The data bits stored in data storage stages I3–T1 are gated in parallel through the respective AND gates 22 and over cable 13 to a data load DL. Although a single rail data output (binary 1's only) from the register 28 is illustrated in FIG. 1, a double rail output (binary 1's and binary 0's) can be obtained by providing additional AND gates 22 having the "0" terminals of the respective data storage stages connected as inputs.

The stop pulse also is transmitted through inverter 15, inverter 16, NOR gate 17 and inverter 18 and appears as a positive going pulse on lead 4. Lead 4 is connected to the advance terminal A of stage EM. It will be recalled that the flip-flop 27 employed as stage EM requires a transition from high potential to low potential as an advance signal. This high-to-low transition is provided by the trailing edge of the positive going pulse on lead 4 which corresponds in time to the trailing edge of the stop pulse. Therefore, no advance signal is applied to stage EM until the termination of the stop pulse.

When the stop pulse ends, the resulting advance signal applied to terminal A of stage EM causes the binary 1 in stage B7 to be entered into stage EM. It will be recalled that the RESET signal previously was removed from terminal C of stage EM. When stage EM assumes the binary 1 state, the "0" terminal of stage EM changes from high to low potential. This low potential is inverted by inverter 20 and appears on lead 8 as a high potential RESET signal. The RESET signal on lead 8 is applied to the terminals C of the data storage stages I3, I2, I1, T2 and T1 and the start bit stage ST. This RESET signal remains until stage EM is again RESET following receipt of the next start pulse. In response to the RESET signal on lead 8, the data storage stages I3–T1 and stage ST are RESET and register 28 is again in its initial condition.

In the event that an error has occurred in the transmission of the stop pulse and the next information pulse received represents a binary 0, no information will be gated out of the register 28. Although the binary 1 in stage ST will still be entered in stage B7 causing both leads 9 and 10 to assume a low potential state, lead 6 will remain in a high potential state unless the stop pulse represents a binary 1. If lead 6 remains at high potential, NOR gate 21 will maintain lead 12 at low potential and no information will be gated from the data storage stages I3–T1 of register 28 through AND gates 22. However, an advance signal will still be applied to stage EM, as described above, and shift register 28 will be restored to its initial condition.

If a transmission error occurs and erroneous information is placed in the shift register, the receipt of six sequential information pulses, all representing binary 0's, will place the receiving arrangement of FIG. 1 in condition to act upon the next group of information pulses. Although stages B7 and EM may not be placed in their usual initial binary 1 state in response to the six sequential binary 0 pulses, the data storage and start bit stages I3–T1 and ST will be RESET and the receiving arrangement will respond accurately to the next received information pulse group.

It is to be understood that the above-described arrangements are illustrative of the application of the principles of the present invention. Numerous other arrangements may be devised by those skilled in the art without departing from the spirit and scope of the invention.

What is claimed is:

1. A data receiving arrangement comprising
a data channel,
a register having an initial state,
first control means responsive to a sequence of pulses on said channel for controlling said register to store data bits represented by said pulse sequence,
inhibiting means responsive to storage in said register of a predetermined number of data bits for inhibiting said first control means,
unloading means responsive to a pulse on said channel when said control means is inhibited for unloading stored data bits from said register,
and restoring means responsive to termination of said last mentioned pulse for restoring said register to said initial state.

2. A data receiving arrangement in accordance with claim 1 wherein
said pulse sequence comprises a series of data pulses preceded in said pulse sequence by a start pulse and followed in said pulse sequence by a stop pulse,
said predetermined number of data bits is equal to one less than the number of pulses in said pulse sequence,
said unloading means is responsive to said stop pulse,
and said restoring means is responsive to termination of said stop pulse.

3. A data receiving arrangement in accordance with claim 2 wherein
said register comprises a sequence of data bit storage elements equal in number to said predetermined number of data bits, each said data bit storage element having an initial state;
said first control means is responsive to each one pulse of said data and start pulses for controlling said register to store the data bit represented by said each one pulse in the first data bit storage element of said register and to advance each previously stored data bit from the bit storage element containing said previously stored bit to the next data bit storage element in said data bit storage element sequence;
said inhibiting means comprises means controlled in accordance with the value of the data bit stored in the last data bit storage element in said data bit storage element sequence for applying an inhibit signal to said first control means;
and said unloading means comprises
a first additional storage element having an initial condition,
second control means responsive to each pulse of said pulse sequence for conditioning said first additional storage element in accordance with the value of the data bit stored in said last data bit storage element,
and gating means jointly controlled by the value of the data bit in said last data bit storage element, the condition of said first additional storage element and said stop pulse, for connecting said data bit storage elements to a data load when said first additional storage element is in said initial condition thereof.

4. A data receiving arrangement in accordance with claim 3 wherein said restoring means comprises
a second additional storage element having an initial condition,
third control means responsive to termination of said stop pulse for conditioning said second additional storage element in accordance with the condition of said first additional storage element.

and means controlled by the condition of said second additional storage element for placing and maintaining each of said data bit storage elements in said initial state when said second additional storage element is in said initial condition thereof.

5. A data receiving arrangement in accordance with claim 4 wherein said first control means comprises
means controlled in accordance with the condition of said first additional storage element for placing and maintaining said second additional storage element in other than said initial condition thereof when said first additional storage element is in other than said initial condition thereof.

6. A serial to parallel data converter for data characters defined by character code elements preceded by a start element and followed by a stop element comprising
a multistage shift register,
means for clearing all registered code elements from said shift register stages and for maintaining said shift register in a cleared condition,
means responsive to received code elements for serially applying said elements including said start element to an initial stage of said shift register and for disabling said clearing means,
means for simultaneously detecting the conditions of said shift register stages,
means jointly responsive to the shifting of said start element to a final stage of said shift register and the reception of said stop element for enabling said detecting means,
and means jointly responsive to the shifting of said start element to said final shift register stage and the termination of said received stop element for enabling said clearing means.

7. A data receiving arrangement for receiving in sequence a predetermined number of coded binary information pulses preceded by a start pulse and followed by a stop pulse comprising
a register including said predetermined number of information stages and a first, second and third control stage, each said register stage having a first and a second stable state and said first and second states corresponding respectively to the coded binary values of said pulses;
said start and stop pulses each having a binary value corresponding to said second state;
means responsive to the leading edge of each one of said start, stop and information pulses for placing said second control stage in the state corresponding to the state of said first control stage;
means controlled by said second control stage for placing and maintaining said third control stage in said first state when said second control stage is in said first state;
register advance means responsive to the leading edge of each one of said start and information pulses for placing the first of said information stages in the state corresponding to the binary coding of said one pulse, for placing each of the others of said information stages in the state corresponding to the state of the immediately preceding information stage, and for placing said first control stage in the state corresponding to the state of the last of said information stages;
inhibiting means controlled by said first control stage for inhibiting said register advance means when said first control stage is in said second state;
means responsive to a pulse coded to correspond to said second state and controlled by said first and second control stages for gating signals defining the respective states of said information stages to an output arrangement only when both said first and second control stages are in said second state;
means responsive to the trailing edge of each of one of said pulses when said second control stage is in said first state for placing said third control stage in said first state;
and means controlled by said third control stage for placing and maintaining each of said information stages and said first control stage in said first state when said third control stage is in said second state.

References Cited

UNITED STATES PATENTS

| | | | |
|---|---|---|---|
| 2,992,416 | 7/1961 | Sims, Jr. | 340—174 |
| 3,160,876 | 12/1964 | Stochel | 340—347 |
| 3,245,040 | 4/1966 | Burdett et al. | 340—172.5 |
| 3,323,113 | 5/1967 | Bennion | 340—174 SR |
| 3,395,400 | 7/1968 | De Witt et al. | 340—172.5 |

PAUL J. HENON, Primary Examiner

M. E. NUSBAUM, Assistant Examiner